United States Patent
Park et al.

(10) Patent No.: US 9,723,243 B2
(45) Date of Patent: *Aug. 1, 2017

(54) USER INTERFACE METHOD FOR TERMINAL FOR VEHICLE AND APPARATUS THEREOF

(71) Applicant: Samsung Electronics Co., Ltd., Gyeonggi-do (KR)

(72) Inventors: Hyung-Kil Park, Gyeonggi-do (KR); Chang-Soo Kim, Seoul (KR); Jun-Yong Choi, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/065,178

(22) Filed: Mar. 9, 2016

(65) Prior Publication Data
US 2016/0191840 A1    Jun. 30, 2016

Related U.S. Application Data

(63) Continuation of application No. 14/147,724, filed on Jan. 6, 2014, now Pat. No. 9,318,018, which is a
(Continued)

(30) Foreign Application Priority Data

May 16, 2011    (KR) ........................ 10-2011-0045568

(51) Int. Cl.
*G06F 19/00*    (2011.01)
*H04N 5/445*    (2011.01)
(Continued)

(52) U.S. Cl.
CPC ..... *H04N 5/44504* (2013.01); *G01C 21/3635* (2013.01); *G01C 21/3658* (2013.01);
(Continued)

(58) Field of Classification Search
CPC ............ G01C 21/3635; G01C 21/3658; G01C 21/3691; G08G 1/00; G08G 1/0962
(Continued)

(56) References Cited

U.S. PATENT DOCUMENTS 5,101,351 A    3/1992  Hattori
5,406,493 A    4/1995  Goto et al.
(Continued)

FOREIGN PATENT DOCUMENTS

CN         101228042 A      7/2008
DE    10 2005 035 412 A1    2/2007
(Continued)

OTHER PUBLICATIONS

Lars Bretzner et al., Towards Low-Cost Systems for Measuring Visual Cues of Driver Fatigue and Inattention in Automotive Applications, 2005, IEEE, p. 161-164.
(Continued)

*Primary Examiner* — McDieunel Marc
(74) *Attorney, Agent, or Firm* — Cha & Reiter, LLC

(57) ABSTRACT

A user interface method for a terminal for a vehicle is provided. The terminal obtains position information to detect a point of a road. A road image of a driving direction is obtained, a lanes of the road represented on the obtained road image is recognized, and a point of a road and lane in which the vehicle having the terminal arranged therein is detected. A virtual road image regarding the recognized lanes is generated, and the generated virtual lanes are added to the road image of the driving direction of the vehicle, and displayed. Traffic information for each lane and surrounding
(Continued)

information (i.e. lane closure, construction, accident, etc.,) at the detected point of the relevant road are obtained, and the obtained information is displayed for each virtual lane.

25 Claims, 11 Drawing Sheets

Related U.S. Application Data continuation of application No. 13/422,235, filed on Mar. 16, 2012, now Pat. No. 8,626,427.

(51) Int. Cl.
G01C 21/36 (2006.01)
G08G 1/0967 (2006.01)
G08G 1/16 (2006.01)
G08G 1/0962 (2006.01)
G08G 1/00 (2006.01)
G06F 3/16 (2006.01)
G06K 9/00 (2006.01)
G08G 1/01 (2006.01)
H04N 5/232 (2006.01)

(52) U.S. Cl.
CPC ......... *G01C 21/3691* (2013.01); *G06F 3/167* (2013.01); *G06K 9/00785* (2013.01); *G06K 9/00798* (2013.01); *G06K 9/00805* (2013.01); *G06K 9/00818* (2013.01); *G06K 9/00825* (2013.01); *G08G 1/00* (2013.01); *G08G 1/0141* (2013.01); *G08G 1/0962* (2013.01); *G08G 1/096716* (2013.01); *G08G 1/096775* (2013.01); *G08G 1/165* (2013.01); *G08G 1/166* (2013.01); *G08G 1/167* (2013.01); *H04N 5/23293* (2013.01)

(58) Field of Classification Search
USPC .................. 701/117, 119; 123/41.12, 41.31; 116/62.3
See application file for complete search history.

(56) References Cited

U.S. PATENT DOCUMENTS

| 6,385,539 | B1 | 5/2002 | Wilson et al. |
| 7,039,521 | B2 | 5/2006 | Hortner et al. |
| 7,353,110 | B2 | 4/2008 | Kim |
| 7,457,705 | B2 | 11/2008 | Takahashi et al. |
| 7,755,508 | B2 | 7/2010 | Watanabe et al. |
| 8,116,523 | B2 | 2/2012 | Amagasaki |
| 8,195,386 | B2 | 6/2012 | Hu et al. |
| 8,406,990 | B2 | 3/2013 | Barkowski et al. |
| 8,482,486 | B2 | 7/2013 | Seder et al. |
| 8,626,427 | B2 | 1/2014 | Park et al. |
| 8,704,653 | B2 | 4/2014 | Seder et al. |
| 9,318,018 | B2 * | 4/2016 | Park ........................ G08G 1/00 |
| 2003/0233261 | A1 | 12/2003 | Kawahara et al. |
| 2005/0192736 | A1 | 9/2005 | Sawada et al. |
| 2007/0290823 | A1 | 12/2007 | Watanabe et al. |
| 2008/0033632 | A1 | 2/2008 | Lee |
| 2008/0195315 | A1 | 8/2008 | Hu et al. |
| 2010/0001883 | A1 | 1/2010 | Koenig |
| 2010/0253540 | A1 | 10/2010 | Seder et al. |
| 2011/0010021 | A1 | 1/2011 | Kobayashi |
| 2011/0187515 | A1 | 8/2011 | Saito et al. |
| 2012/0226392 | A1 | 9/2012 | Kataoka |
| 2012/0296561 | A1 * | 11/2012 | Park ................... G01C 21/3635 701/119 |

FOREIGN PATENT DOCUMENTS

| JP | 4-219900 A | 8/1992 |
| JP | 8-2356 A | 1/1996 |
| JP | 2004-101280 A | 4/2004 |
| JP | 2005-202787 A | 7/2005 |
| JP | 2006-27427 A | 2/2006 |
| JP | 2006-175936 A | 7/2006 |
| JP | 2007-334566 A | 12/2007 |
| JP | 2009-168779 A | 7/2009 |
| KR | 10-2006-0027717 A | 3/2006 |
| KR | 10-2007-0030449 A | 3/2007 |
| KR | 10-2009-0064946 A | 6/2009 |

OTHER PUBLICATIONS

Jiang Yu Zheng et al., Scanning Scene Tunnel for City Traversing, 2006, IEEE, vol. 12, No. 2, p. 155-167.
Brian Milligan et al., Selecting and Commanding Groups in a Multi-Robot Vision Based System, 2011, IEEE, p. 415.
Huang Kai et al., Research on Effectiveness of Freeway Work Zone Speed Reduction Strategies, 2010 International Conference on Optoelectronics and Image Processing, IEEE, p. 218-220.
Gianni Cario et al., Data Fusion Algorithms for Lane Departure Warning Systems, 2010 American Control conference, IEEE, p. 5344-5349.
Japanese Search Report, dated Jun. 21, 2016.
Japanese Notice of Patent Grant, dated Aug. 23, 2016.
Korean Search Report dated Mar. 7, 2017.
European Search Report dated Apr. 11, 2017.

* cited by examiner

USER INTERFACE METHOD FOR TERMINAL FOR VEHICLE AND APPARATUS THEREOF

CROSS REFERENCE TO RELATED APPLICATIONS

This application is a Continuation of U.S. patent application Ser. No. 14/147,724 filed on Jan. 6, 2014 which claims the benefit of the earlier U.S. patent application Ser. No. 13/422,235 filed on Mar. 16, 2012 and assigned U.S. Pat. No. 8,626,427 issued on Jan. 7, 2014 which claims the benefit of priority under 35 U.S.C. §119(a) from a Korean patent application filed in the Korean Intellectual Property Office on May 16, 2011 and assigned Serial No. 10-2011-0045568, the entire disclosure of which is hereby incorporated by reference in its entirety.

BACKGROUND

1. Field of the Invention

The present invention relates to a terminal for a vehicle. More particularly, the present invention relates to a user interface method for providing information helpful to an operator while driving a vehicle and an apparatus thereof.

2. Description of the Related Art

An automobile in many parts of the world has become a primary movement means of a modern society. However, it is well known that an automobile traffic accident can endanger lives of a driver and a fellow passengers, and way to reduce the amount of automobile accidents is sought by traffic experts, safety experts, and insurance companies.

Recently, various terminals for a vehicle have been developed to assist with driving, and example of such a terminal is a navigation terminal. The navigation terminal provides information of a path and directions for the fastest route to drive, and even informs the driver when to turn, etc. Furthermore, a vehicle has various equipment for safe driving, such as, for example, a rear camera allowing a user to view the back of the vehicle when pulling out of a parking spot, a distance sensor informing a distance between cars to assist in a safe park, etc.

With regard to the navigation terminal, typically, such navigation terminals provide only a path from a departure to a destination and does not provide traffic information for regarding potential hazards on the roadway. As there is a danger of a traffic accident caused by a car in front, back or to either side of the vehicle always exists, an alternative method for providing traffic information for each surrounding vehicle is needed.

SUMMARY

An exemplary aspect of the present invention provides a user interface method for assisting a user to drive safely and an apparatus thereof for driving a vehicle.

Another exemplary aspect of the present invention is to provide a user interface method for providing information helpful to driving a vehicle, and an apparatus thereof.

Still another exemplary aspect of the present invention is to provide a user interface method for providing traffic information for each road and surrounding information and an apparatus thereof for driving a vehicle.

Yet another exemplary aspect of the present invention is to provide a user interface method for providing traffic information and surrounding information of a roadway to be changed with priority in case of changing the carriageway in driving a vehicle, and an apparatus thereof.

Further yet another exemplary aspect of the present invention is to provide a user interface method for inducing a user's safe driving by additionally showing traffic information and surrounding information for each roadway and the surrounding lanes by providing an image that shows an actual road, and an apparatus thereof.

Other exemplary aspects, advantages and salient features of the presently claimed invention will become apparent a person of ordinary skill in the art from the following detailed description, which, taken in conjunction with the annexed drawings, discloses exemplary embodiments of the invention.

In accordance with an exemplary aspect of the present invention, a user interface method for a terminal for a vehicle comprises obtaining position information to detect a point of a road, obtaining a road image of a driving direction, recognizing a road represented on the obtained road image, and detecting a point of a road, generating a virtual road regarding the recognized road, adding the generated virtual road to the road image of the driving direction, and displaying the same, and obtaining traffic information for each road and surrounding information at the detected point of the relevant road, and informing an operator or passenger of the vehicle with the obtained information for each virtual road.

In accordance with another exemplary aspect of the present invention, an apparatus for a terminal for a vehicle comprises an output unit that outputs image data and voice data, a position information receiver that obtains position information, a rear camera that captures a road image of a driving direction, a traffic information receiver that receives traffic information for each road via at least one network, a vehicle sensor receiver that communicates with a vehicle via a wired line or wirelessly, and obtains surrounding information for each road from the vehicle, a storage that stores a predetermined program for controlling an overall operation, and various data input/output when a control operation is performed, and a controller that performs an overall control; wherein the controller recognizes a road from the road image of the driving direction, detects a road in which the terminal is positioned, generates a virtual road for the recognized road and adds the generated virtual road to the road image of the driving direction and displays the same, detects a point of a road from the position information, and displays traffic information and surrounding information for each road at the detected point of the relevant road for each virtual road.

A vehicle having a user interface apparatus according to the present invention is provided wherein the apparatus comprises an output unit for outputting image data and voice data, a position information receiver for obtaining position information, a rear camera for capturing a road image of a driving direction, a traffic information receiver for receiving traffic information for each road being traveled via at least one network, a vehicle sensor receiver for communicating with a vehicle via a wired line or wirelessly, and obtaining surrounding information for each road from the vehicle, a storage for storing a predetermined program for controlling an overall operation, and various data input/output when a control operation is performed, and a controller for performing an overall control, wherein the controller recognizes a road from the road image of the driving direction, detects a road in which the terminal is positioned, generates a virtual road for the recognized road and adds the generated virtual road to the road image of the driving direction and displays the same, detects a point of a road from the position information, and displays traffic information and surrounding information for each road at the detected point of the relevant road for each virtual road.

BRIEF DESCRIPTION OF THE DRAWINGS

The above and other exemplary aspects, features and advantages of certain exemplary embodiments of the present invention will be more apparent from the following description taken in conjunction with the accompanying drawings in which.

Throughout the drawings, like reference numerals will be understood to refer to like parts, components and structures.

DETAILED DESCRIPTION

The following description with reference to the accompanying drawings is provided to assist a person of ordinary skill in the art with a comprehensive understanding of exemplary embodiments of the User Interface Method for a Terminal For a Vehicle and Apparatus thereof as defined by the claims and their equivalents. The description contains various specific details to assist the person of ordinary skill in the art with that understanding but these details are to be regarded as merely exemplary and illustrative. Accordingly, those of ordinary skill in the art will recognize that various changes and modifications of the exemplary embodiments described herein can be made without departing from the scope and spirit of the invention as defined by the appended claims. Also, descriptions of well-known functions and constructions may be omitted for clarity and conciseness when their inclusion may obscure appreciation of the present invention with such well-known functions and constructions.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustrative purposes only and not for the purpose of limiting the invention as defined by the appended claims and their equivalents.

Figure 1:
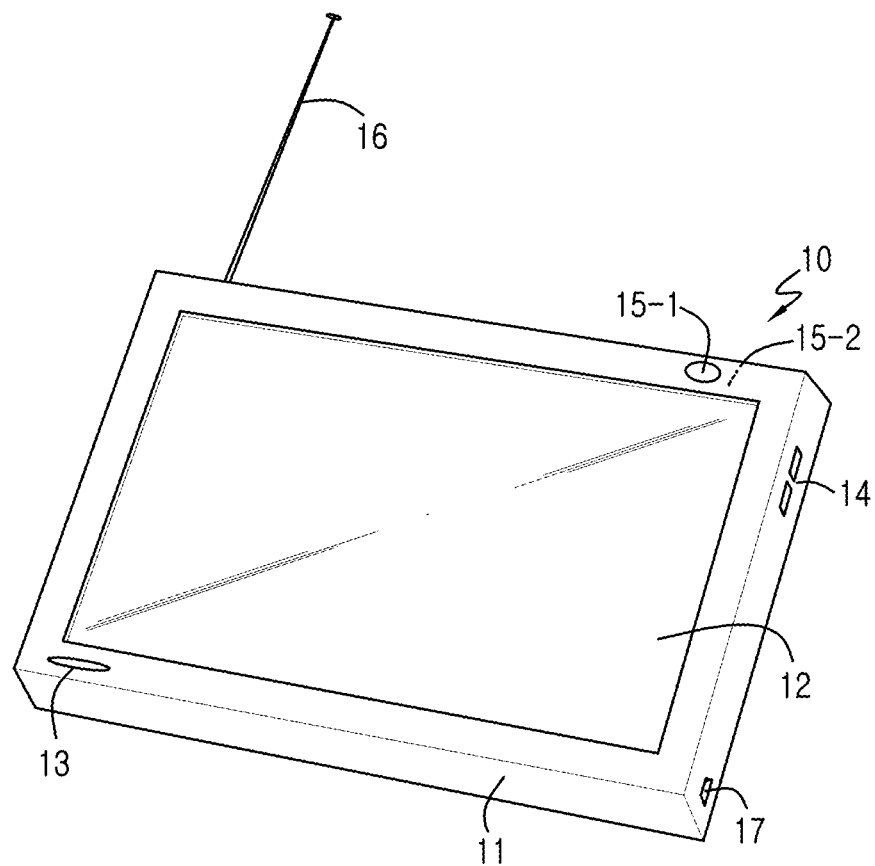
FIG. 1 is a perspective view illustrating a terminal for a vehicle according to an exemplary embodiment of the present invention.

FIG. 1 is a perspective view illustrating a terminal for a vehicle according to an exemplary embodiment of the present invention.

Referring now to FIG. 1, the terminal 10 for a vehicle includes a case frame 11 forming an appearance and the following elements inserted into the case frame 11. The terminal 10 for a vehicle preferably includes a display 12 for displaying image data, a speaker 13 for outputting voice data, a button 14 for input, a front camera 15-1 for image capturing, a rear camera 15-2 (not shown), an antenna 16 required for transmitting/receiving a Radio Frequency (RF) signal, and an external connector 17 for electrically connecting with an external device to communicate with the same. When a touch panel is added to the display 12, a touch screen may be provided. The terminal 10 for a vehicle has a sensor, included but not limited to a Global Positioning System (GPS) sensor to detect a position and a movement velocity. Furthermore, the terminal 10 for a vehicle provides a driving path to a destination using a stored map, and provides traffic information regarding the driving path in the form of an image or voice. The traffic information regarding driving may be received via various networks.

More particularly, the terminal 10 for a vehicle according to an exemplary embodiment of the present invention detects a point of a road corresponding to the position of the terminal 10 itself using the GPS sensor. In addition, the terminal 10 obtains a road image of a front direction of the vehicle, that is, the driving direction via the rear camera 15-2, and recognizes a road represented on the obtained road image to detect a road on which the terminal 10 itself is positioned. The terminal 10 generates a virtual road regarding the recognized road and adds the virtual road to the image of the front direction of the vehicle. Furthermore, the terminal 10 obtains traffic information for each road at the detected point of the road and informs the traffic information for each virtual road to assist the user in visualizes the surrounding environment and possible risk. Furthermore, the terminal 10 for a vehicle according to an exemplary embodiment of the present invention may communicate with a vehicle and receive sensor information and vehicle operation information from the vehicle to inform the information for each virtual road. The sensor information provided by the vehicle may be information detected by a distance sensor. The distance sensor detects a distance the vehicle is from an obstacle. The obstacle can be fixed or in motion. The vehicle operation information provided by the vehicle may be information regarding a vehicle operation such as flickering of left/right directional light, steering operation of a steering wheel, on/off of a break, etc. Furthermore, the terminal 10 may track a user's eyes viewing a screen using the front camera 15-1. As described later, only a relevant virtual road and corresponding information may be provided depending on flickering of the left/right directional light or steering direction of the steering wheel, and the user's eyes.

Figure 2A:
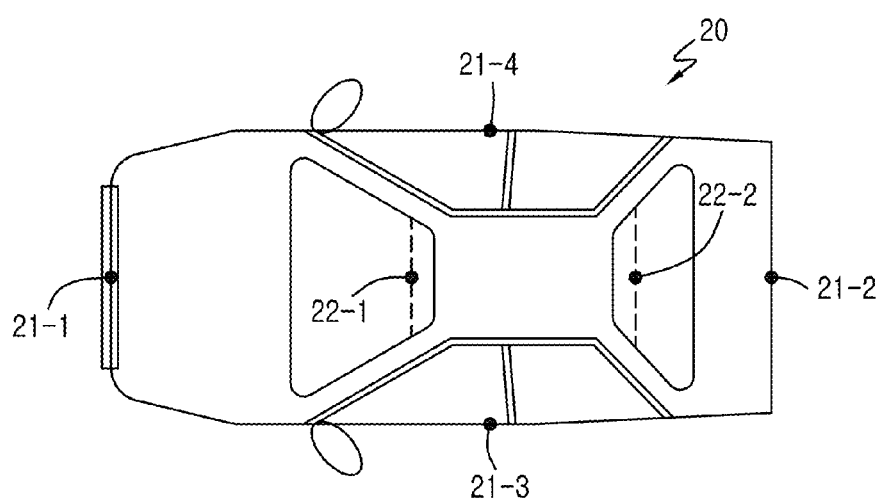
FIG. 2A is a view illustrating that a camera and a sensor are configured in a vehicle according to an exemplary embodiment of the present invention.

FIG. 2A is a view illustrating a camera and a sensor are configured in a vehicle according to an exemplary embodiment of the present invention. Referring now to FIG. 2A, a vehicle according to an exemplary embodiment of the present invention includes one or more distance sensors 21-1, 21-2, 22-1, and 22-2 provided to the front, the rear, and the sides of the vehicle. The distance sensor detects a distance up to an obstacle. The distance sensor comprise an ultrasonic sensor or an infrared sensor.

Figure 2B:
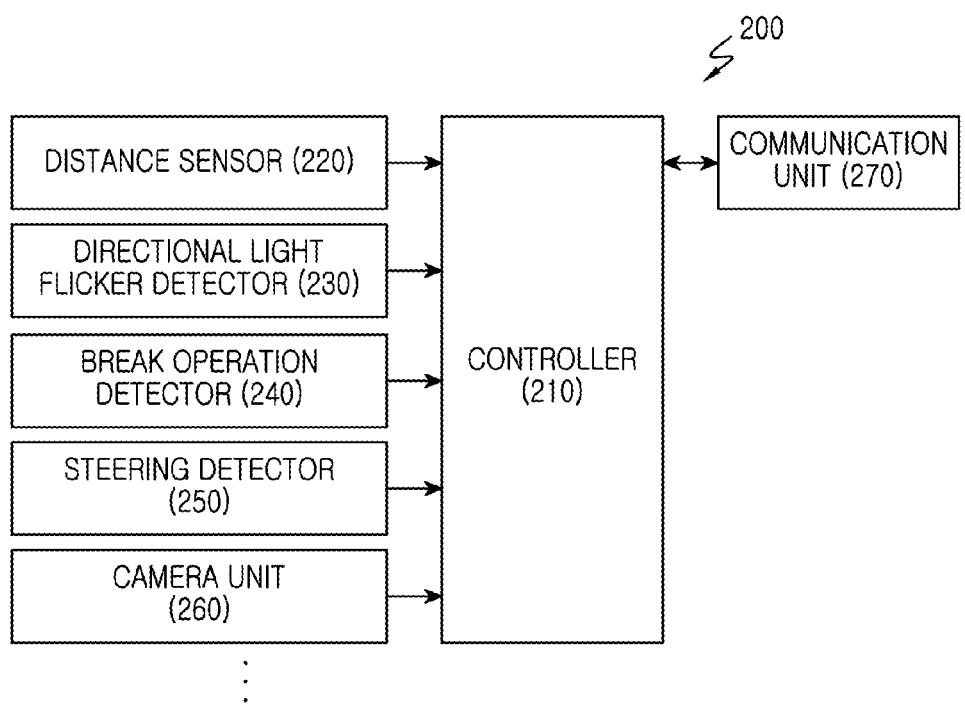
FIG. 2B is a block diagram illustrating an apparatus for obtaining sensor information and vehicle operation information in a vehicle according to an exemplary embodiment of the present invention.

FIG. 2B is a block diagram illustrating an apparatus for obtaining sensor information and vehicle operation information in a vehicle according to an exemplary embodiment of the present invention.

Referring now to FIG. 2B, the apparatus preferably includes a controller 210 for performing a control of an overall operation, and a communication unit 270 for communicating with the terminal 10 for a vehicle. The elements for providing information to the controller 210 may include a distance sensor 220, a directional light flicker detector 230, a break operation detector 240, a steering detector 250, a camera unit 260, etc. The distance sensor 220, which can use optical or ultrasound, for example, detects a distance up to an object (for example, a counterpart vehicle) in the front, the rear, or the sideway, separated from the vehicle, and informs the controller 210 of the distance. The directional light flicker detector 230 detects flickering of a left directional light or a right directional light and informs the controller 210 of the detected flickering. The break operation detector 240 detects that a break operates and informs the controller 210 of the detected operation. The steering detector 250 detects steering of the steering wheel and informs the controller 210 of the detected steering. The camera unit 260 obtains an image of the front of the vehicle or an image of the rear of the vehicle and provides the obtained image to the controller 210. The controller 210, which comprises a processor or microprocessor, transmits information provided from respective elements to the terminal for a vehicle via the communication unit 280. The controller may be configured for communicating with "on-board" systems that are included in some newly built vehicles, and the present invention can replace or augment such systems.

Figure 3:
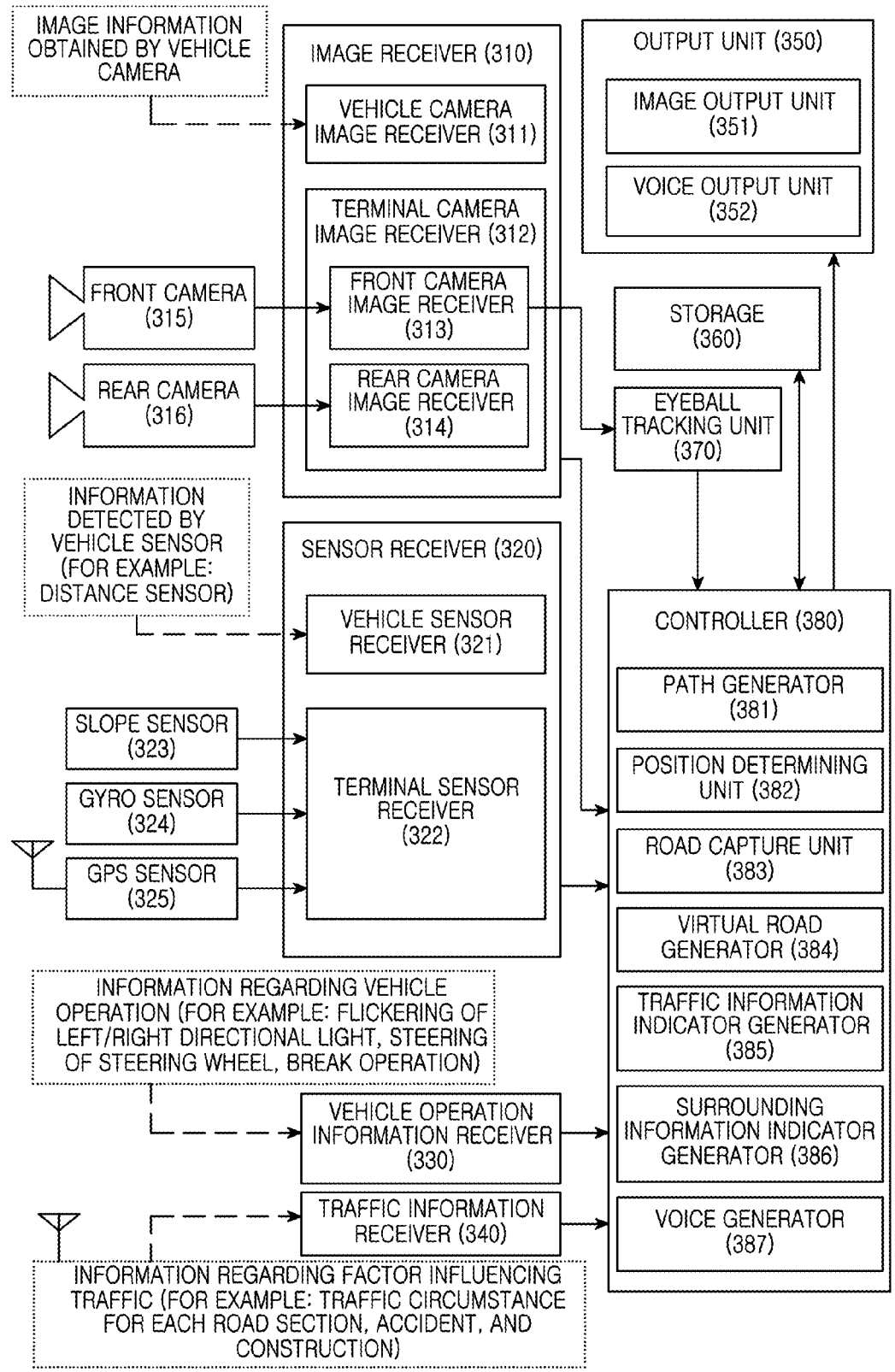
FIG. 3 is a block diagram illustrating a terminal for a vehicle according to an exemplary embodiment of the present invention.

FIG. 3 is a block diagram illustrating a terminal for a vehicle according to an exemplary embodiment of the present invention.

Referring now to FIG. 3, the terminal for a vehicle preferably includes an image receiver 310, a sensor receiver 320, a vehicle operation information receiver 330, a traffic information receiver 340, an output unit 350, a storage unit 360, an eyeball tracking unit 370, and a controller 380. These components may be further separated or further integrated than the exemplary layout shown in the drawings. The image receiver 310 receives image information and preferably includes a vehicle camera image receiver 311 and a terminal camera image receiver 312. The vehicle camera image receiver 311 receives image information captured by a camera provided to the vehicle from the vehicle. The terminal camera image receiver 312 receives image information captured by cameras provided to the terminal. The terminal camera image receiver 312 includes a front camera image receiver 313 for obtaining image information captured by a front camera 315, and a rear camera image receiver 314 for obtaining image information captured by a rear camera 316. The rear camera 316 keeps "eyes" on the front of a vehicle, that is, a road of the driving direction.

A person of ordinary skill in the art viewing the terminal in FIG. 1 will appreciate that camera 15-1 is positioned similarly to front camera 315 and camera 15-2 is positioned similarly to rear camera 316. In other words, the "rear camera" is in the rear of the terminal 10, and when in the vehicle, would capture in its intended position, would capture images in front of the vehicle, whereas front camera 315 would capture images of the driver or rear of the vehicle. Thus, if the terminal is positioned, for example, on the top of the dashboard, the rear camera 316 would obtain images of the front of the road, similar to rear camera 15-2 (shown in FIG. 1) which is actually located in the back of the terminal 10, which is why it is not shown and represented by dashed lines. The front camera 315 observes a driver's view of a vehicle, and could be positioned, for example, similar to front camera 15-1 shown in FIG. 1, at least in terms of front versus rear.

The sensor receiver 320 receives information detected by various sensors, and includes a vehicle sensor receiver 321 and a terminal sensor receiver 322. The vehicle sensor receiver 321 receives information detected by a sensor (for example, a distance sensor) provided to the vehicle from the vehicle. The terminal sensor receiver 322 obtains information detected by sensors provided to the terminal. Known sensors provided to the terminal may be an acceleration sensor 323, a gyro sensor 324, a GPS sensor 326, etc. More particularly, position information provided from the GPS sensor 326 is used for detecting a point of a road corresponding to the position of the terminal, and thus, the position of the vehicle.

The vehicle operation information receiver 330 communicates with a vehicle wirelessly or via a wired line, and receives information regarding a vehicle operation from the vehicle. The vehicle operation may be flickering of left/right directional light, steering of a steering wheel, on/off of a break, etc.

The traffic information receiver 340 receives information regarding a factor having an influence on traffic at the point of the road detected using the position information via at least one network. More particularly, the traffic information receiver 340 may receive traffic information for each road, including the road currently being traveled on and adjacent roads or roads that recommended by navigation to arrive at one's desired destination. The factor having an influence on the traffic may be a traffic circumstance for each road section, an accident, a construction, etc.

The output unit 350 preferably includes an image output unit 351, typically a display) for outputting image data and a voice output unit 352 for outputting voice data.

The storage 360 stores map data for providing a recommended path for travel, a predetermined program for controlling an overall operation, and various data input/output when a control operation is performed.

The eyeball tracking unit 370 tracks a user's eye(s) while viewing a screen from an image provided from the front camera image receiver 313 of the image receiver 310, and informs the controller 380 of the position of the user's eye(s) being tracked.

The controller 380, which comprises a processor or microprocessor configured to control an overall operation of the terminal, and includes a path generator 381, a road capture unit 382, a virtual road generator 383, a traffic information indicator generator 384, a surrounding information indicator generator 385, and a voice generator 386.

The path generator 381 generates a path from map data of the storage 360 and outputs the generated path to the output unit 350.

With continued reference to FIG. 3, the position determining unit 382 receives position information from the terminal sensor receiver 322 to detect a point of a road corresponding to the position information.

The road capture unit 383 recognizes a road represented on a road image of the front of a vehicle provided from the rear camera image receiver 314, and detects a road as well as the particular lane corresponding to the position of the vehicle having the terminal. The road capture unit 383 may recognize a road and identify the lane by analyzing a road image of the front of the vehicle via an image analysis method such as an intelligence analysis method, a two dimensional binary method, etc.

The virtual road generator 384 generates a virtual image of a road with traffic lanes for a road recognized by the carriage capture unit 383, and adds the virtual image of the road to the image displayed of the front of the vehicle afterward being output to the image output unit 352.

The traffic information indicator generator 385 receives traffic information for each road obtained by the traffic information receiver 340 with respect to a point of a relevant road detected by the position determining unit 382, and loads an indicator for informing the user of traffic information for each virtual road from the storage 360.

After that, the traffic information indicator generator 385 outputs a relevant indictor for each lane of the virtual road via the image output unit 352. Furthermore, the traffic information indicator generator 385 may represent a degree of swift driving (i.e. speed) using visually distinctive characteristics (i.e. different colors, brightness, size, highlighting, etc.,) of a virtual road based on the traffic information for each road and surrounding information. The surrounding information is subsequently described herein. For example, a virtual road allowing relatively high speeds may be represented using a blue color, and a virtual road requiring relatively slower driving may be represented using a red color.

The surrounding information indicator generator 386 determines surrounding information from information sensed by vehicle sensors obtained by the sensor receiver 320 and information sensed by sensors inside the terminal, and generates/loads an indicator for representing the determined surrounding information from the storage 360. The surrounding information may include a distance up to a front vehicle, a distance up to a vehicle in the sideway, etc. After that, the surrounding information indicator generator 386 outputs a relevant indicator for each virtual road via the image output unit 352. For example, an indicator representing a distance up to a front vehicle is displayed on a virtual road and/or a lane on which the vehicle is positioned, and an indicator representing a distance up to a vehicle in the sideway is displayed on a side virtual road.

The voice generator 387 loads voice regarding the traffic information and the surrounding information from the storage 360, and outputs the voice to the voice output unit 352.

More particularly, the controller 380 may control the elements to inform a relevant virtual carriageway, corresponding traffic information, and corresponding surrounding information depending on a user's eyes detected by the eyeball tracking unit 370 among a plurality of virtual roads. For example, when the user views a left road on a road image of the front of a vehicle, a virtual road for the left road, corresponding traffic information, and corresponding surrounding information are displayed.

Furthermore, the controller 380 may control the elements to inform a relevant virtual road, corresponding traffic information, and corresponding surrounding information depending on information provided by the vehicle operation information receiver 330 among a plurality of virtual roads. For example, when a left directional light flickers or a steering wheel is rotated to the left, a virtual road for the left road, corresponding traffic information, and corresponding surrounding information are added to a road image of the front of the vehicle and displayed.

In addition, the controller 380 may show only a virtual road to which the vehicle belongs from among a plurality of virtual roads, and provide traffic information and surrounding information regarding this virtual road.

In addition, the controller 380 may change a method for reporting traffic information and surrounding information depending on information provided by the vehicle operation information receiver 330. For example, when the vehicle's braking system engages to slow or stop the vehicle, an indicator representing a distance up to another vehicle directly in front or in the path of the present vehicle where the driver and terminal are positioned is displayed in relief.

As described above, the controller 380 outputs data regarding a user interface via the output unit 350 of the terminal for a vehicle. The controller 380 is not limited thereto, but may transmit data regarding the user interface to a vehicle that communicates with the terminal via a wired line or wirelessly, and the vehicle may output the user interface via a relevant output means (for example, a display), which can include audio, visual, or a combination thereof.

The controller 380 of the terminal for a vehicle according to an exemplary embodiment of the present invention may preferably include the image receiver 310, a sensor receiver 320, a vehicle information receiver 330, a traffic information receiver 340, and an eyeball tracking unit 370.

Based on this construction, a user interface method of the controller 380 according to an exemplary embodiment of the present invention is described with further reference to the accompanying drawings.

Figure 4:
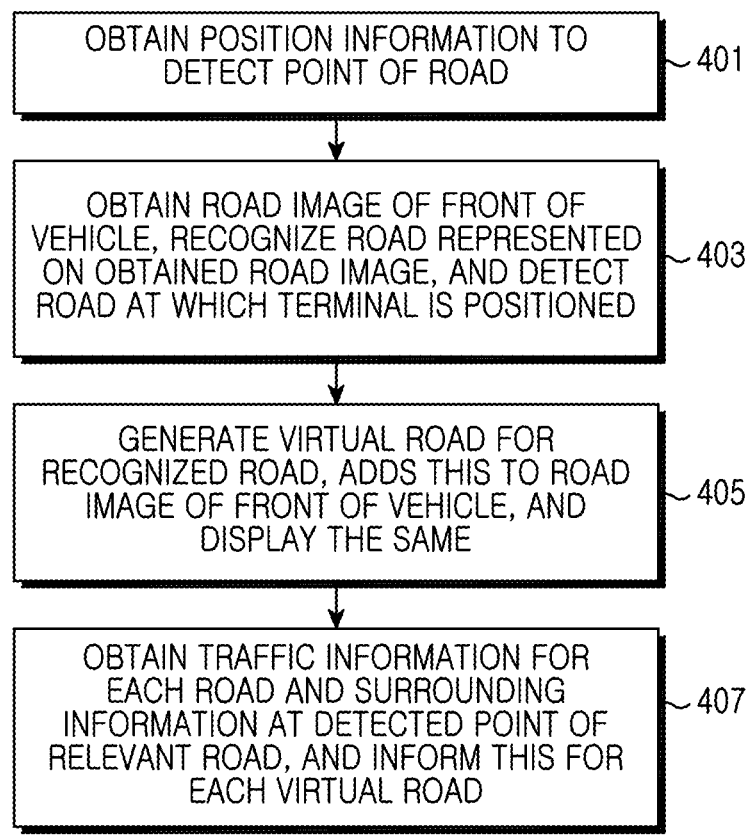
FIG. 4 is a flowchart illustrating exemplary operation of a user interface procedure for a terminal for a vehicle according to an exemplary embodiment of the present invention.

FIG. 4 is a flowchart illustrating exemplary operation of a user interface procedure for a terminal for a vehicle according to an exemplary embodiment of the present invention.

Referring now to FIG. 4, at (S401) the controller 380 obtains position information to detect a point of a road corresponding to the position information.

At (S403), the controller 380 obtains a road image of the area in front of the vehicle, recognizes a road represented on the obtained road image, and detects the road where the terminal is positioned. The recognition may optionally include the type of road and the name of the road.

At (S405), the controller 380 generates a virtual image of the road corresponding to the recognized road from (S403), adds the virtual road to the road image of the front of the vehicle, and displays the same image.

At (S407), the controller 380 obtains traffic information for each road and surrounding information at the detected point of the road, and informs the information for each virtual road.

Figure 5:
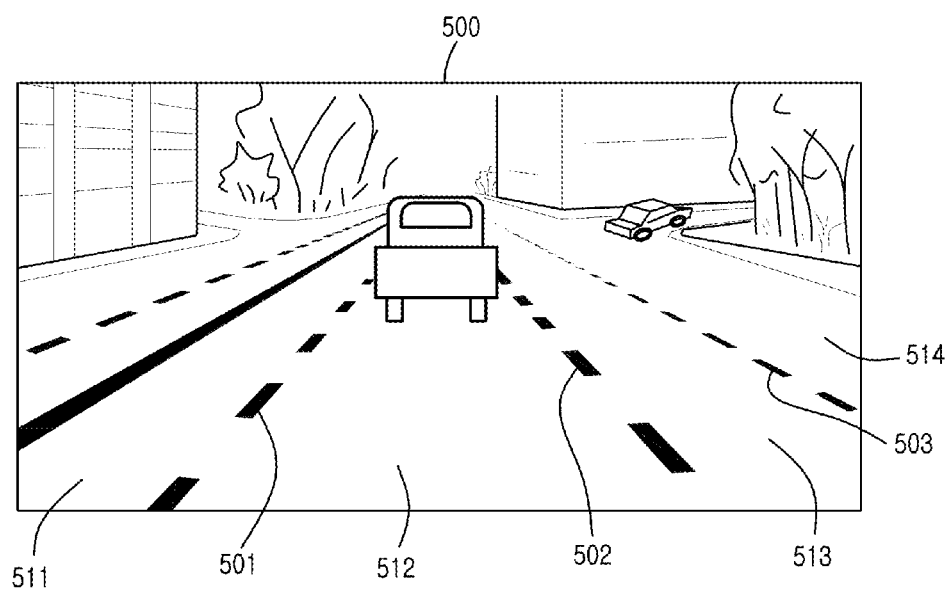
FIG. 5 is a screen showing a road image of a front side of a vehicle in a terminal for a vehicle according to an exemplary embodiment of the present invention.

FIG. 5 is a screen showing a road image of a front side of a vehicle in a terminal for a vehicle according to an exemplary embodiment of the present invention. This image is substantially similar to what a driver might see looking through the windshield.

Referring now to FIG. 5, a road image 500 of the front of a different vehicle according to an exemplary embodiment of the present invention is captured by viewing a driving direction using a camera in at least one of a vehicle terminal or a camera of a vehicle. The road image 500 shows a surrounding vehicle, building, traffic lanes 511, 512, 513, and 514, and traffic lanes 501 and 502 discriminating respective roads. A vehicle and a terminal for a vehicle are positioned at a road 512 on the center of the screen in the lane adjust the very-most left lane, when one considers the solid line to be a painted or physical division for traffic that moves in opposite directions.

Figure 6:
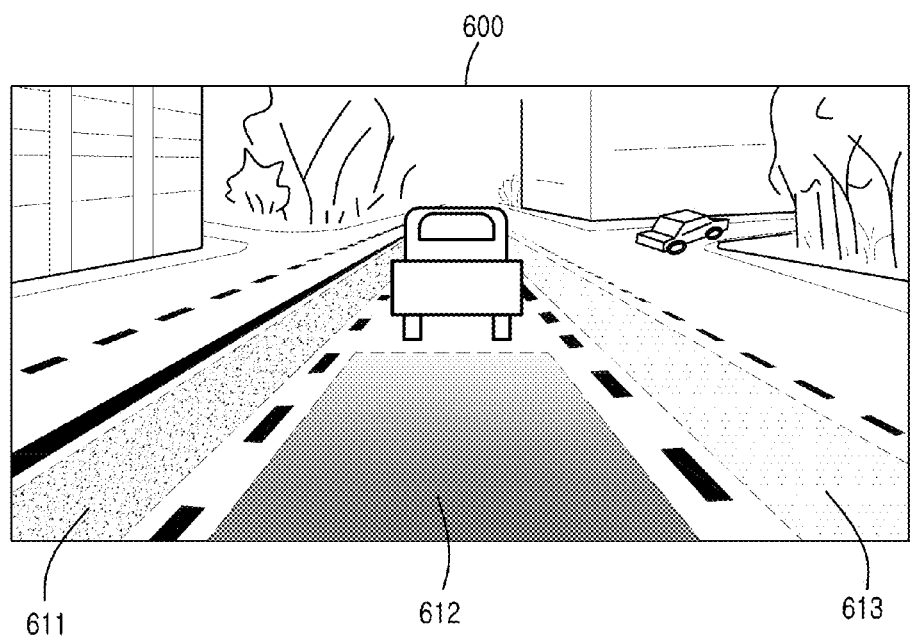
FIG. 6 is a screen showing a user interface in a terminal for a vehicle according to an exemplary embodiment of the present invention.

FIG. 6 is a screen showing a user interface in a terminal for a vehicle according to an exemplary embodiment of the present invention.

Referring now to FIG. 6, a user interface according to an exemplary embodiment of the present invention adds a virtual road corresponding to a recognized road onto a road image 600 in a driving direction and displays the same. More particularly, each lane of the virtual road is designated and displayed by a color representing a degree of the speed of driving depending on traffic information and surrounding information. For example, the driving speed can be divided into high, medium, and low. A color corresponding to each degree may be designated. For example, a virtual lane 611 of the road whose driving speed is fast may be represented by a red color, a virtual lane 612 whose driving speed is low may be represented by a blue color, and a virtual lane 613 whose degree of swift driving is medium may be represented by a yellow color.

Figure 7:
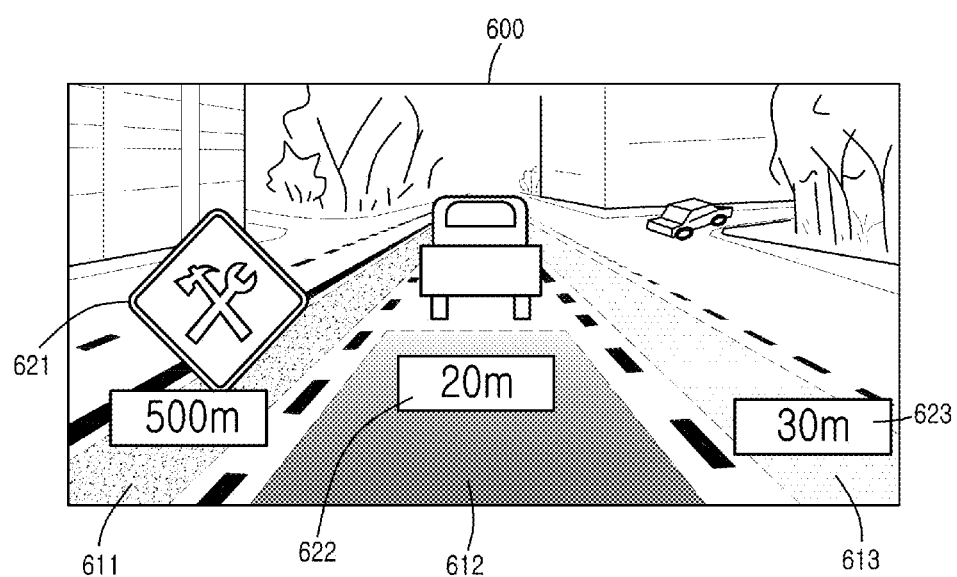
FIG. 7 is a screen showing a user interface in a terminal for a vehicle according to an exemplary embodiment of the present invention.

FIG. 7 is a screen showing a user interface in a terminal for a vehicle according to an exemplary embodiment of the present invention. As described with reference to FIG. 6, the user interface according to an exemplary embodiment of the present invention adds a virtual lane corresponding to a recognized road onto the road image 600 of the driving direction, and displays the same. More particularly, each virtual lane is designated and displayed using a color representing a degree of speed depending on traffic information and surrounding information. In FIG. 7, the color may signify slow speed as there is a construction sign, indicating that lane has construction further ahead (500 m away).

Furthermore, a user interface according to an exemplary embodiment of the present invention adds an indicator 621 depending on traffic information for each lane of the road and indicators 622 and 623 depending on surrounding information for each lane to a virtual road, and displays the same.

Figure 8:
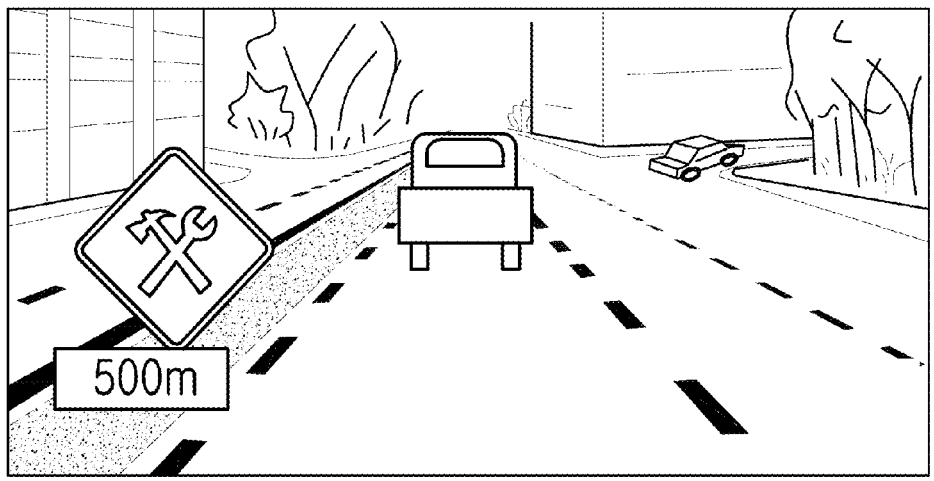
FIG. 8 and FIG. 9 are screens showing a user interface in a terminal for a vehicle according to an exemplary embodiment of the present invention.
Figure 9:
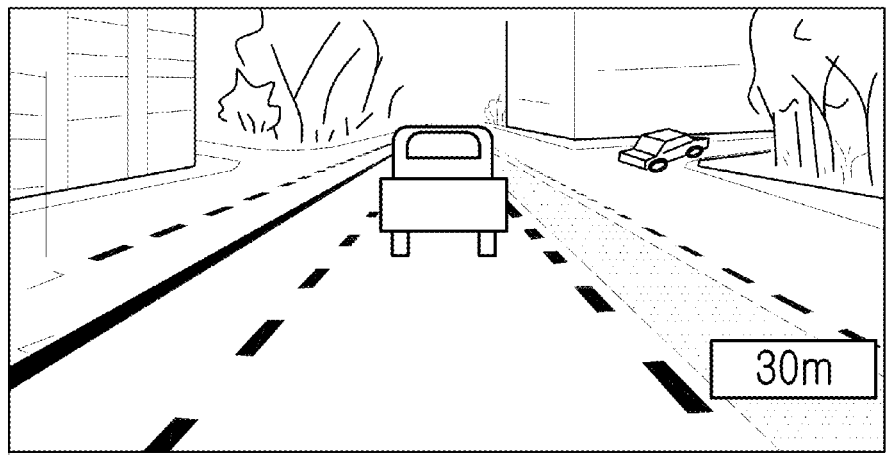

FIGS. 8 and 9 are screens showing a user interface in a terminal for a vehicle according to an exemplary embodiment of the present invention. The user interface displays the construction described in FIGS. 6 and 7. However, in the case where vehicle operation information, more particularly, a relevant directional light flickers or eyes are tracked to a relevant road of a road image, only an indicator of a relevant virtual road and corresponding traffic information and an indicator of surrounding information are displayed. For example, when a left directional light of a vehicle flickers or a user keeps eyes on a left road of a road image, indicators of a virtual road corresponding to the left road, corresponding traffic information, and surrounding information are displayed.

Figure 10A:
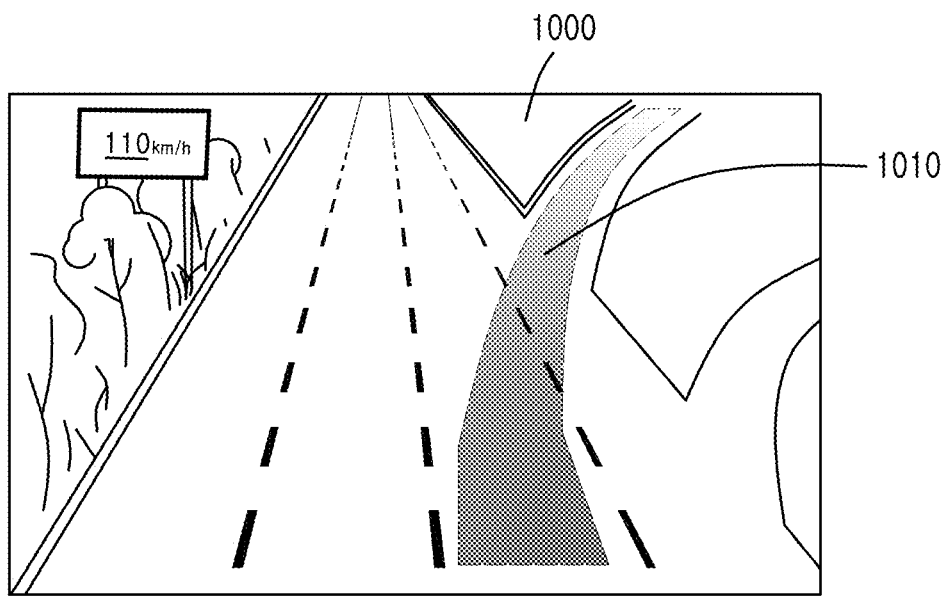
FIG. 10A and FIG. B are screens showing a user interface in a terminal for a vehicle according to an exemplary embodiment of the present invention.

FIGS. 10A and B are screens showing a user interface in a terminal for a vehicle according to an exemplary embodiment of the present invention.

Figure 10B:
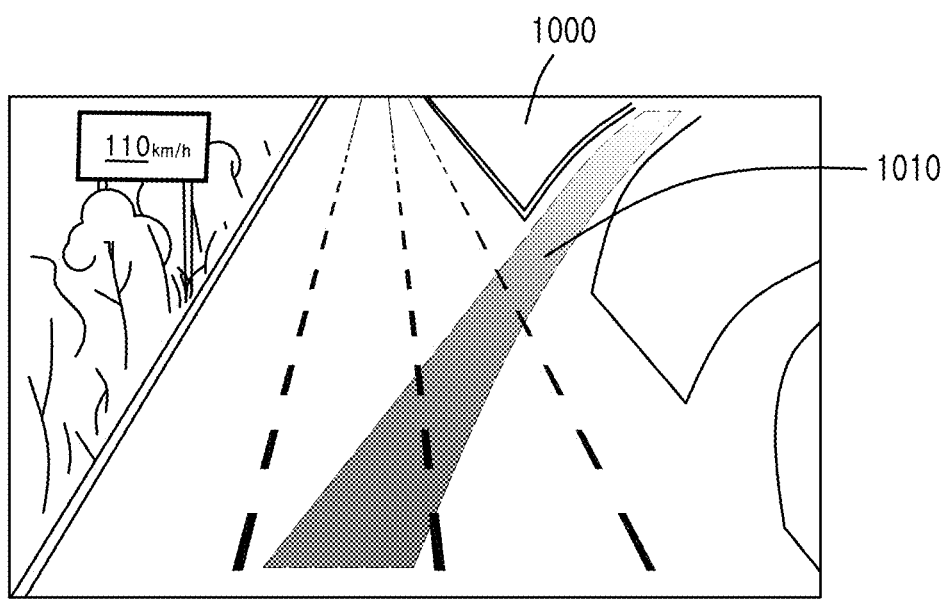

As illustrated in FIGS. 10A and 10B, when a path is designated, the path is displayed (1010) on the road image 1000 of the front of the vehicle shown in real-time. However, as is known from a difference between FIG. 10A and FIG. 10B, the path is shown based on a lane where the vehicle is currently positioned and if one were to follow the exact path shown in either the lane in FIG. 10A or 10B, would receive a traffic infraction. The present invention would in lieu of or in association with GPS or other types of navigation, direct the driver to move to the rightmost lane at a safe and legal distance prior to exiting the road to follow path 1010.

Consequently, the present invention is helpful to a user's safe driving by providing a virtual road with lanes based on the actual road being traveled, and includes traffic information for each lane and surrounding information to an image showing an actual road.

The above-described methods according to the present invention can be implemented in hardware or via the execution of software or computer code that can be stored in a recording medium such as a CD ROM, an RAM, a floppy disk, a hard disk, or a magneto-optical disk or downloaded over a network and stored on a non-transitory machine readable medium, so that the methods described herein can be rendered in such software using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. An apparatus for a vehicle, the apparatus comprising:
a display; and
a processor adapted to:
acquire, using a camera included in the vehicle, an image corresponding to at least one object external to the vehicle, the at least one object including a road having one or more lanes;
generate, based at least in part on the image, a first graphic indication indicating at least one portion of a lane of the one or more lanes;
generate a second graphic indication indicating at least one portion of traffic information related to the road; and
present, via the display, the first graphic indication and the second graphic indication.

2. The apparatus of claim 1, wherein the processor is adapted to:
identify the at least one portion of the lane based at least in part on an image analysis of the image.

3. The apparatus of claim 1, wherein the processor is adapted to:
obtain different information as at least part of the traffic information based at least in part on a location of the vehicle.

4. The apparatus of claim 1, wherein the traffic information comprises traffic flow information, accident information, or construction information related to the road.

5. The apparatus of claim 1, wherein the processor is adapted to:
obtain the traffic information using a communication interface or a sensor operatively coupled with the vehicle.

6. The apparatus of claim 5, wherein the processor is adapted to:
generate the second graphic indication based at least in part on the image or the traffic information.

7. The apparatus of claim 1, further comprising a voice output interface, wherein the processor is adapted to:
generate a voice corresponding to the at least one portion of the traffic information; and
present the voice via the voice output interface.

8. The apparatus of claim 1, wherein the processor is adapted to:
change a color, a shape, or a size of the first graphic indication displayed via the display based at least in part on a location, a movement, or a speed of the vehicle.

9. The apparatus of claim 1, wherein the processor is adapted to:
display the first graphic indication as overlaid with an area of the image displayed via the display, the area corresponding to a line for the lane.

10. The apparatus of claim 1, wherein the at least one object includes another vehicle, a pedestrian, a building, or a sign, and wherein the processor is adapted to:
identify a distance between the vehicle and a corresponding one of the other vehicle, the pedestrian, the building, and the sign; and
display information indicating the distance as at least part of the second graphic indication.

11. An apparatus for a vehicle, the apparatus comprising:
memory to store traffic information; and
a processor adapted to:
acquire, using a camera included in the vehicle, an image corresponding to at least one object external to the vehicle, the at least one object including a road having one or more lanes;
generate, based at least in part on the image, a first graphic indication indicating at least one portion of a lane of the one or more lanes;
generate a second graphic indication indicating at least one portion of the traffic information related to the road; and
present, via a display included in the vehicle, the first graphic indication and the second graphic indication.

12. The apparatus of claim 11, wherein the traffic information comprises traffic flow information, accident information, or construction information related to the road.

13. The apparatus of claim 11, wherein the processor is adapted to: identify the at least one portion of the lane based at least in part on an image analysis of the image.

14. The apparatus of claim 11, wherein the processor is adapted to: generate the first graphic indication based at least in part on the lane corresponding to a position of the vehicle on the road.

15. The apparatus of claim 11, wherein the processor is adapted to: present the first and second graphic indications as overlaid with an area of the image displayed via the display, the area corresponding to a line for the lane.

16. The apparatus of claim 11, wherein the processor is adapted to: change a color, a shape, or a size of the first graphic indication displayed via the display based at least in part on a location or a driving speed of the vehicle.

17. The apparatus of claim 11, wherein the processor is adapted to: obtain the at least one portion of the traffic information using a communication interface or a sensor operatively coupled with the vehicle.

18. A vehicle comprising:
a camera;
a sensor;
a communication interface;
a display; and
a processor adapted to:
acquire, using the camera, an image corresponding to at least one object external to the vehicle, the at least one object including a road having one or more lanes;
generate, based at least in part on the image, a first graphic indication indicating at least one portion of a lane of the one or more lanes;
obtain traffic information related to the road using the sensor or the communication interface;
generate a second graphic indication indicating at least one portion of the traffic information; and
present, via the display, the first graphic indication and the second graphic indication.

19. The vehicle of claim 18, where in the processor is adapted to:
identify the at least one portion of the lane based at least in part on an image analysis of the image.

20. The vehicle of claim 18, wherein the at least one object includes another vehicle, a pedestrian, a building, or a sign, and wherein the processor is adapted to:
identify a distance between the vehicle and a corresponding one of the other vehicle, the pedestrian, the building, and the sign; and
display information indicating the distance as at least part of the second graphic indication.

21. The vehicle of claim 18, where in the processor is adapted to:
present, via the display, the first graphic indication and the second graphic indication as overlaid with an area of the image displayed via the display, the area corresponding to a line for the lane.

22. A machine-readable storage device storing instructions that, when executed by one or more processors, cause the one or more processors to perform operations comprising:
acquiring, using a camera included in a vehicle, an image corresponding to at least one object external to the vehicle, the at least one object including a road having one or more lanes;
generating, based at least in part on the image, a first graphic indication indicating at least one portion of a lane of the one or more lanes;
generating a second graphic indication indicating at least one portion of traffic information related to the road; and
presenting the first graphic indication and the second graphic indication.

23. The machine-readable storage device of claim 22, wherein the acquiring comprises: identifying the at least one portion of the lane based at least in part on an image analysis of the image.

24. The machine-readable storage device of claim 22, wherein the presenting comprises: displaying the first graphic indication as overlaid with an area of the image displayed via the display, the area corresponding to a line for the lane.

25. The machine-readable storage device of claim 22, further comprising a voice output interface and wherein the presenting comprises:
   generating a voice corresponding to the at least one portion of the traffic information; and
   presenting the voice via the voice output interface.

\* \* \* \* \*